United States Patent [19]

Carpenter et al.

[11] 3,719,885

[45] March 6, 1973

[54] STATISTICAL LOGIC TEST SYSTEM HAVING A WEIGHTED RANDOM TEST PATTERN GENERATOR

[75] Inventors: Robert Gordon Carpenter; Eric Lindbloom, both of Poughkeepsie; Maurice Thomas McMahon, Jr., Wappingers Falls, all of N.Y.

[73] Assignee: International Business Machines Corporation, Armonk, N.Y.

[22] Filed: Dec. 13, 1971

[21] Appl. No.: 207,460

[52] U.S. Cl.............................324/73 R, 235/153 AC
[51] Int. Cl. ..............................................G01r 15/12
[58] Field of Search ...............324/73 R; 235/153 AC

[56] References Cited

UNITED STATES PATENTS 3,614,608  10/1971  Giedd et al. ........................324/73 R
3,636,443  1/1972  Singh et al. ..........................324/73 R

*Primary Examiner*—Robert J. Corcoran
*Attorney*—Theodore E. Galanthay et al.

[57] ABSTRACT

A system for testing complex circuitry primarily in large scale integration where a great number of inputs and outputs must be tested and the internal circuitry is inaccessible. The test system has a weighted random number generator which applies a test signal to some input terminals of the logic under test more frequently than others. A particular input terminal to the logic under test can be accessed in proportion to the circuit switching activity associated with accessing that particular terminal.

9 Claims, 2 Drawing Figures

STATISTICAL LOGIC TEST SYSTEM HAVING A WEIGHTED RANDOM TEST PATTERN GENERATOR

CROSS REFERENCE TO RELATED APPLICATIONS, PATENTS AND PUBLICATIONS

1. U.S. Pat. No. 3,614,608, inventor Giedd et al., and assigned to the assignee of the present application.
2. Application Ser. No. 193,440, inventor H. D. Schnurmann, "A System for Determining the Testability of a Non-Linear Integrated Circuit by an Electrical Signal Test Pattern".
3. Application Ser. No. 168,259, inventor M. T. McMahon, Jr., "Testing of Non-Linear Circuits by Accumulated Result Comparision".
4. H. D. Schnurmann, IBM TDB Vol. 15, No. 6 p. 726, dated Nov. 1972.

BACKGROUND OF THE INVENTION

Field of the Invention

Our invention relates to a logic test system and more specifically to a system for testing integrated circuits wherein various ones of the input terminals are accessed more frequently than others, usually in proportion to the circuit switching activity associated with the particular input terminal.

DESCRIPTION OF THE PRIOR ART

The concept of statistical testing was originally invented by Giedd et al. in the above referenced U.S. Pat. No. 3,614,608. The advantages of statistical testing and the reasons for adopting statistical testing techniques in complex integrated circuits are discussed in that patent. As circuit integration has become even denser and the complexity of integrated circuits (including an increased percentage of inaccessible circuit nodes) has increased, a need for increasing the speed and improving the effectiveness of statistical testing has developed.

SUMMARY OF THE INVENTION

Accordingly, it is an object of our invention to improve statistical testing techniques and provide an improved statistical logic test system.

It is a more specific object of this invention to adapt random test patterns to specific needs of specific part numbers.

It is a still further object of this invention to provide improved fault coverage in statistical testing techniques.

In accordance with the present invention, a weighted statistical test pattern is applied to the input terminals of a logic circuit under test. A random number generator first generates a statistical test pattern. This test pattern (or a portion thereof) is provided as an input to a decoder circuit. The decoder provides an output representing the binary value of the input. The outputs of the decoder are supplied as inputs to a semiconductor chip i.e., logic circuit under test. In accordance with the present invention, a plurality of the outputs of the decoder are adapted to be applied to particular ones of the inputs of the logic circuit under test. In this manner, certain inputs to the logic circuit under test are activated more frequently than others, as desired. For example, chip inputs can be exercised in proportion to the amount of nodal switching activity their activation provides. Typical circuits that need to have their inputs activated more frequently than others include "clocks" and strings of triggers. In the case of a string of triggers, for example, the input to the initial trigger must be activated many times before a single output is received. By weighting the inputs in this manner, the test chips are exercised more effectively, resulting in increased testability. Also, the advantages of statistical testing are retained in that minimal data provides a large number of test patterns. These test patterns are provided at a very high speed since the test patterns need not be generated under computer control. Nevertheless, even though the test patterns are random, they are adapted to the needs of specific part numbers by means of the weighting technique.

The foregoing and other objects, features and advantages of our invention will be apparent from the following and more particular description of the preferred embodiment as illustrated in the accompanying drawings.

DESCRIPTION OF THE PREFERRED EMBODIMENT

Figure 1:
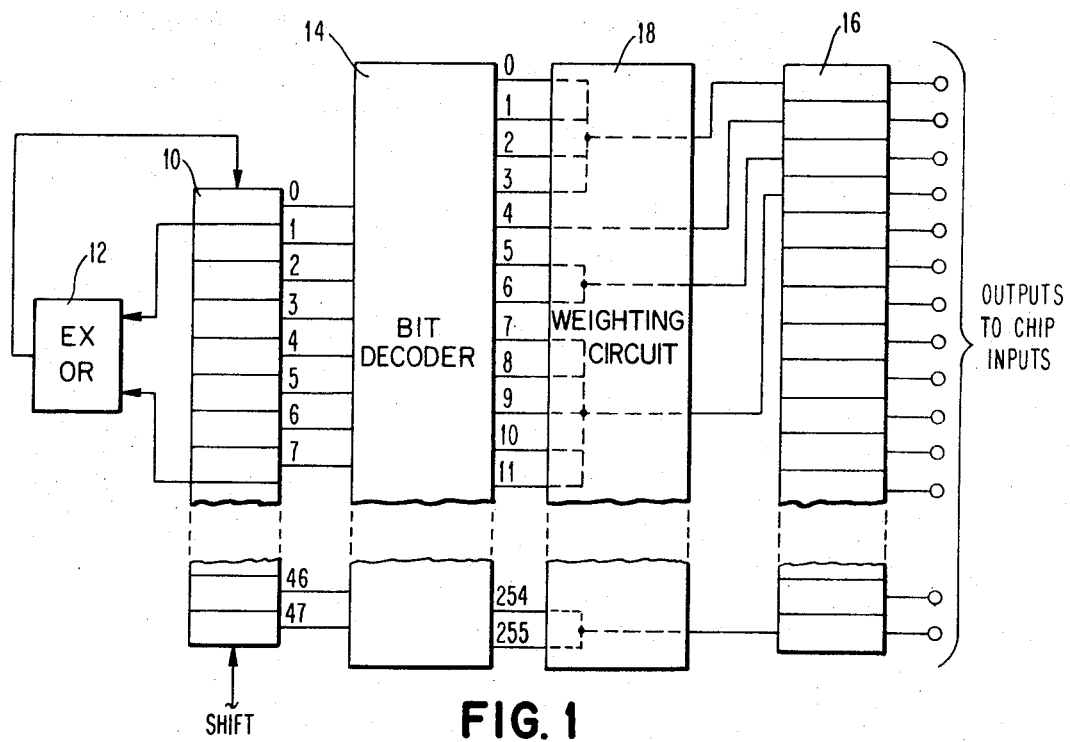
FIG. 1 is a generalized block diagram of a preferred embodiment of our invention.

Refer now to FIG. 1 for a basic block diagram in accordance with our invention. Shift register 10 and exclusive OR circuit 12 form a random number generator. The disclosed preferred embodiment shows a pseudo-random generator, it being understood that any random or pseudo-random number generator would perform the intended function. Two of the outputs of the shift register 10 are received as inputs by exclusive-OR circuit 12. The output of exclusive-OR circuit is supplied as the next input into the first stage of shift register 10. Shift register 10 is not the recirculating type so that the last bit which is in the 48th stage is dropped each time the register is shifted. At least several outputs of the shift register are supplied to the decoder circuit 14. In the preferred embodiment, we use a 256 bit decoder which requires at least 8 inputs. Any size bit decoder can be used and shift register 10 is required to provide only "N" inputs to bit decoder 14, "N" being derived from the formula "$2^N$ = the number of decoded output bits."

Figure 2:
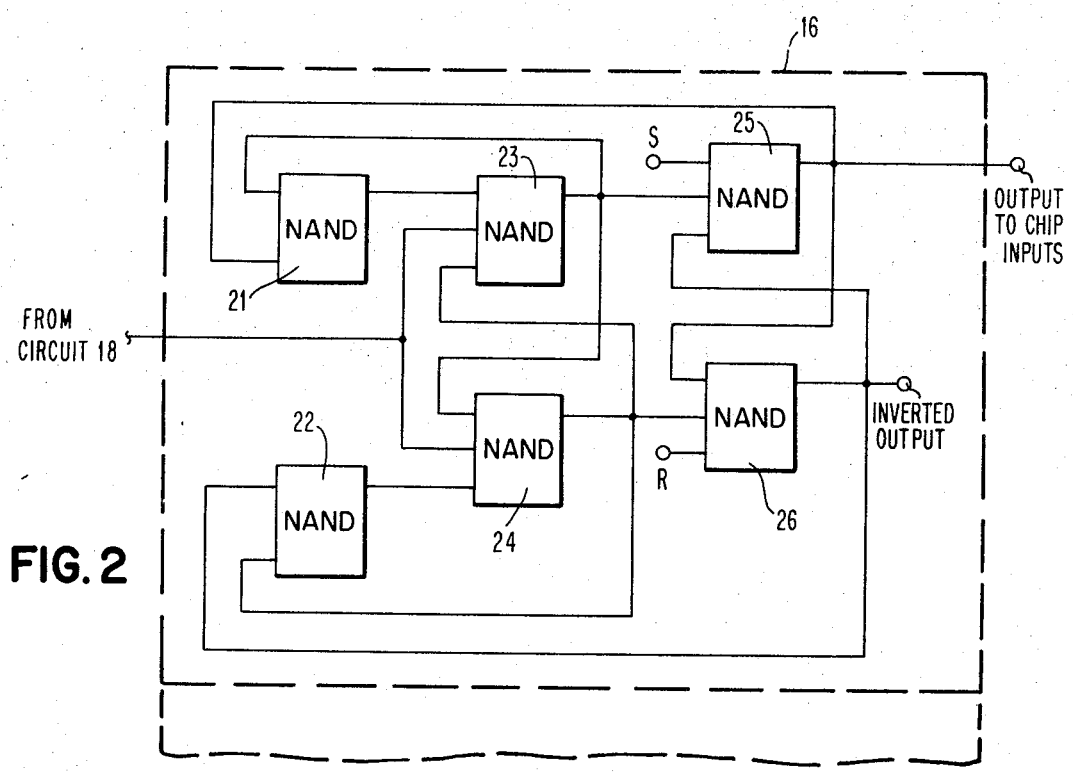
FIG. 2 is a binary trigger.

The outputs of decoder 14 are supplied to bit changing circuits 16 through weighting circuit 18. Whenever any one of bit changing circuits 16 receives an input, it changes the input supplied to the chip under test. Any one of bit changing circuits 16 is an ordinary binary trigger, as illustrated in FIG. 2. FIG. 2 shows a plurality of NAND circuits 21–26 connected in a conventional manner. The input is normally at a down level. An up level input signal is supplied to NAND circuits 23 and 24. The in phase output signal is taken from circuit 25 while an out of phase output is available from circuit 26. The set "S" and reset "R" inputs to circuits 25 and 26 are normally at an up level. The output of each of NAND circuits 21–26 is an inverted "AND" function.

A very important aspect of the present invention is weighting circuit 18. Its simplest implementation is shown within block 18 in which various outputs of decoder 14 are "ORED" together as with a plug board panel or with a programmable relay tree. In a most sophisticated version, the function illustrated by weighting circuit 18 is provided by software in which the particular hardware interconnections shown are set up by computer programs.

OPERATION

In operation, shift register 10 and exclusive OR circuit 12 operate in their conventional and well known manner as described in greater detail in the aforementioned U.S. Patent to Giedd et al. Any convenient pattern of ones and zeroes can initially be set into shift register 10. Two of the outputs of shift register 10 are supplied ro exclusive OR circuit 12 which provides its output as the input to the first stage of shift register 10. Each time the shift register 10 receives a shift pulse, the bit pattern therein is shifted by one position. If exclusive OR circuit 12 receives two similar inputs, (i.e. two "zeroes" or two "ones") then it will insert a "0" into the first stage of shift register 10. On the other hand, if the inputs to exclusive-OR circuit 12 are dissimilar then a "1" will be inserted into the first stage of shift register 10. This generates a random pattern for application to decoder circuit 14.

By way of example, a 256 bit decoder is shown, actually requiring only eight inputs from shift register 10. It is readily apparent that a decoder for $2^{48}$ bits could be activated by shift register 10. Similarly, for the present example, an eight bit shift register would be adequate. Decoder circuit 14 operates as any binary to decimal decoder notoriously well known in the art. As a simple example, if all the inputs received from shift register 10 are "zeroes", then the particular output of decoder 14 indicative of a decimal "zero" (for example the top most output) will have a "1" output while all the remaining outputs are at a "0" level. Similarly, if all the inputs from shift register 10 are "ones", then the line indicative of the decimal number 255 (as for example, the bottom most output) would provide a "1" output while all the other outputs remain at a "0" level. For intermediate values of binary inputs, another one of the intermediate outputs of decoder 14 would provide a "1" output. With such an arrangement, the probability of selecting any one of the 256 output lines of decoder 14 is equal.

In the previously cited patent to Giedd et al., a 48 bit shift register would normally only address 48 inputs of a chip under test. The herein disclosed decoder, however, permits the addressing of 256 inputs with only an eight bit shift register. Moreover, a larger decoder would permit the selection of $2^{48}$ inputs with the presently disclosed 48 bit shift register. However, an even more significant advantage is attainable by our invention. Assuming that we activate 48 inputs of a chip under test, then, with the present invention, it io possible to weight the inputs to a chip under test by assigning a plurality of decoder outputs to a particular chip input. The pattern generator formed by a shift register 10 and exclusive OR circuit 12 has its output weighted by the combination of decoder circuit 14 and weighting circuit 18. Because the total number of outputs from decoder 14 is much greater than the number of chip inputs, it is possible to provide a large weight variation among the various chip inputs. In the example of FIG. 1, chip input number 1 is statistically accessed four times as frequently as chip input number 2, because four decoder outputs are assigned to the first input of the chip while only one output is assigned to the second input of the chip. Further, in the example shown, two outputs are assigned to chip input 3, while five decoder outputs are assigned to chip input number 4. In this manner, the chip inputs are weighted, greatly enhancing the benefits of the random testing. The outputs of decoder 14 are not directly applied to the chip inputs but rather through bit changing circuit 16. One of bit changing circuits 16 is illustrated in FIG. 2 and its operation is well known in the art. Essentially, whenever one of bit changing circuits 16 (which essentially are binary triggers well known in the art) receives an up level input, it changes the state of its output. Thus, if the output of the binary trigger is in the "1" or up level state and an up level is received at the input, it will change its output to the "0" state. The next time it receives an up level input, the output will revert to the "1" state etc. Thus, one of the inputs to the chip under test has a change of logical state during every cycle.

In accordance with one technique for determining the particular weights to be assigned to a given chip input, the following steps are to be followed:

1. Simulate the logic circuit to be tested on a computer and apply a set of random test patterns thereto.
2. For each pattern, record the number of circuits within the simulated logic circuit that switched. Here it is understood that a pattern change involves changing only one of the inputs to the simulated logic. Also, the internal circuit switching activity is recorded as well as the actual changes at the output.
3. Accumulate a record of the amount of circuit switching activity associated with each input terminal over a full set of test patterns to be used on the actual product.
4. Weight the pattern generator in such a way that the number of times the input terminal is switched is proportional to the circuit switching activity associated with that terminal.
5. Apply the weighted pattern set to the simulated logic circuit and thus repeat steps 2-4 with each new weighted pattern set until the weights stop changing or until the total circuit switching activity stops increasing.

The foregoing steps, including the determination of circuit switching activity could be performed manually by "counting" the number of circuits that switch when a particular input terminal is switched. In this manner, weighted patterns could be developed for each part number. As a practical matter, to minimize the tedious work associated with computing the actual optimum weights, various computer programs have been developed as disclosed in the referenced patent application and publication to Schnurmann. Although the concept of the present invention is useful and workable with manual techniques, its advantages are greatly enhanced by use of the referenced programming techniques.

In conclusion, there has been described an apparatus and method for greatly increasing the capability of statistical test equipment. Structurally, a decoding and weighting circuit interposed between the random number generator and a chip under test are disclosed. As the method, the counting of circuit switching activity associated with the activation of a particular input terminal to a chip under test followed by weighting of a test pattern in proportion to that activity is disclosed.

While the invention has been shown and particularly described with reference to preferred apparatus and methods, it will be understood by those skilled in the art that various changes in form and detail may be made therein without departing from the spirit and scope of the invention.

What is claimed is:

1. A statistical logic test system for applying an optimum test signal to an integrated circuit, said circuit having a plurality of input and output terminals and also having a plurality of inaccessible internal circuit nodes, said test system comprising:
   means for generating a random test pattern; and
   means for weighting said random test pattern and for changing the input signal to certain ones of said plurality of input terminals more frequently than other ones of said plurality of input terminals.

2. A statistical logic system as in claim 1 wherein the means for generating the random test pattern comprises:
   a shift register means; and
   an exclusive OR circuit means receiving an input from at least two of the states of said shift register means and providing an input to said shift register means.

3. A statistical logic system as in claim 1 wherein the means for weighting comprises:
   decoding means for providing a plurality of outputs a single discrete one of said plurality of outputs being indicative of the random test pattern received from the generating means during a desired interval of time; and
   means for selectively applying a plurality of said single discrete outputs of said decoding means to certain ones of said plurality of input terminals.

4. A statistical logic system as in claim 1 wherein said means for weighting further comprises:
   a plurality of binary trigger means connected as the output of said means for weighting;
   each one of said plurality of binary trigger means changing its output whenever a signal is applied to its input, the output of said binary trigger means being supplied to one of said plurality of input terminals.

5. The method of determining the test signal to be applied during the testing of an integrated circuit having a plurality of input and output terminals and also having a plurality of inaccessible internal circuit nodes comprising the steps of:
   simulating the integrated circuit to be tested;
   applying a random test pattern to the simulated circuit;
   determining the amount of simulated circuit switching activity associated with a signal change on each one of said plurality of input terminals; and
   weighting the test pattern such that the number of times the input signal to a particular input terminal is switched is proportional to the circuit switching activity associated with that input terminal;
   thereby providing a larger number of input signals to those ones of the plurality of input terminals that result in the greatest amount of circuit switching activity in both the output terminals and said plurality of inaccessible internal circuit nodes.

6. The method of determining the test signal to be applied during the testing of an integrated circuit as in claim 5 further comprising the steps of:
   repeating the steps of applying, determining and weighting, until a desired optimum weighted pattern is obtained.

7. The method of testing an integrated circuit having a plurality of input and output terminals and also having a plurality of inaccessible internal circuit nodes comprising the steps of:
   generating a statistically random test pattern;
   decoding said test pattern, thereby obtaining a plurality of discrete decoded signals; and
   applying a statistically unequal number of said decoded signals to said plurality of input terminals; and periodically analyzing the signals on said plurality of output terminals of the integrated circuit under test to determine the condition of said circuit.

8. A statistical logic test system for applying an optimum test signal to an integrated circuit, said circuit having a plurality of input and output terminals and also having a plurality of inaccessible internal circuit nodes, said test system comprising:
   means for generating a random test pattern; and
   means for weighting said random test pattern and for changing the input signal to one of said plurality of input terminals more frequently than another one of said plurality of input terminals.

9. A statistical logic system as in claim 8 wherein the means for weighting comprises:
   decoding means for providing a plurality of outputs, a single discrete one of said plurality of outputs being indicative of the random test pattern received from the generating means during a desired interval of time; and
   means for selectively applying a plurality of said single discrete outputs of said decoding means to certain ones of said plurality of input terminals.

* * * * *